US012388616B2

(12) United States Patent
Schoenauer et al.

(10) Patent No.: US 12,388,616 B2
(45) Date of Patent: Aug. 12, 2025

(54) FAULT DETECTION OF DIFFERENTIAL FAULT ATTACK IN LATTICE BASED CRYPTOGRAPHY

(71) Applicant: NXP B.V.

(72) Inventors: Markus Schoenauer, Vienna (AT); Melissa Azouaoui, Norderstedt (DE); Olivier Bronchain, Auderghem (BE); Tobias Schneider, Graz (AT); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 359 days.

(21) Appl. No.: 18/169,467

(22) Filed: Feb. 15, 2023

(65) Prior Publication Data

US 2024/0275576 A1 Aug. 15, 2024

(51) Int. Cl.
*H04L 9/00* (2022.01)
*H04L 9/30* (2006.01)
*H04L 9/32* (2006.01)

(52) U.S. Cl.
CPC ............ *H04L 9/004* (2013.01); *H04L 9/3093* (2013.01); *H04L 9/3247* (2013.01)

(58) Field of Classification Search
CPC ...... H04L 9/004; H04L 9/3093; H04L 9/3247; H04L 9/3066
USPC .......................................................... 713/176
See application file for complete search history.

(56) References Cited

U.S. PATENT DOCUMENTS

| 8,826,025 | B2* | 9/2014 | Sakumoto | H04L 9/3221 |
| | | | | 713/176 |
| 8,959,355 | B2* | 2/2015 | Sakumoto | H04L 9/3093 |
| | | | | 713/176 |
| 11,799,662 | B2* | 10/2023 | Shahar | H04L 9/3263 |
| 2017/0214664 | A1* | 7/2017 | Birgisson | H04W 12/084 |
| 2019/0108109 | A1* | 4/2019 | Ghosh | H04L 9/004 |

(Continued)

FOREIGN PATENT DOCUMENTS

WO 2020162973 A1 8/2020

OTHER PUBLICATIONS

Prasanna Ravi et al.; "Side-channel and Fault-injection attacks over Lattice-based Post-quantum Schemes (Kyber, Dilithium): Survey and New Results"; Dec. 4, 2022; Paper 2022/737; IACR International Association for Cryptologic Research, https://eprint.iacr.org/2022/737.

(Continued)

*Primary Examiner* — Lizbeth Torres-Diaz

(57) ABSTRACT

A data processing system comprising instructions embodied in a non-transitory computer readable medium, the instructions for a fault detection in a digital signature algorithm in a processor, the instructions, including: computing vector z based on a secret nonce vector y, a first secret key vector $s_1$, and a challenge polynomial c, wherein vectors z, y, and $s_1$ include l polynomials having n coefficients, wherein polynomial c has n coefficients, and wherein l and n are integers; computing a difference value between all of the coefficients of the polynomials in the vector z; computing a number of how many of the computed difference values are outside a specified value range; computing a digital signature for an input message; and rejecting the digital signature when the computed number is greater than a threshold value.

16 Claims, 1 Drawing Sheet

(56) References Cited

U.S. PATENT DOCUMENTS

| | | | |
|---|---|---|---|
| 2022/0029824 A1 | 1/2022 | Poeppelmann | |
| 2022/0083439 A1* | 3/2022 | Ghosh | H04L 9/3252 |
| 2022/0131848 A1* | 4/2022 | Shiner | H04W 12/48 |
| 2023/0188337 A1* | 6/2023 | Bert | H04L 9/0894 |
| | | | 713/171 |
| 2023/0188366 A1* | 6/2023 | Steinmetz | H04L 9/3247 |
| | | | 713/176 |
| 2024/0275576 A1* | 8/2024 | Schoenauer | H04L 9/004 |

OTHER PUBLICATIONS

P.E. Beckmann and B.R. Musicus, Fast fault-tolerant digital convolution using a polynomial residue number system, IEEE Transactions on Signal Processing 41(1993), No. 7, 2300-2313.

Nina Bindel, Johannes Buchmann, and Juliane Krämer, Lattice-based signature schemes and their sensitivity to fault attacks, 2016 Workshop on Fault Diagnosis and Tolerance in Cryptography, FDTC 2016, Santa Barbara, CA, USA, Aug. 16, 2016, IEEE Computer Society, 2016, pp. 63-77.

L. Ducas, Eike Kiltz, Tancrède Lepoint, Vadim Lyubashevsky, P. Schwabe, Gregor Seiler, and D. Stehle, Crystals-dilithium algorithm specifications and supporting documentation (version 3.1), 2021.

Thomas Espitau, Pierre-Alain Fouque, Benoît Gerard, and Mehdi Tibouchi, Loopabort faults on lattice-based fiat-shamir and hash-and-sign signatures, Selected Areas in Cryptography—SAC 2016—23rd International Conference, St. John's, NL, Canada, Aug. 10-12, 2016, Revised Selected Papers (Roberto Avanzi and Howard M. Heys, eds.), Lecture Notes in Computer Science, vol. 10532, Springer, 2016, pp. 140-158.

Leon Groot Bruinderink and Peter Pessl, Differential Fault Attacks on Deterministic Lattice Signatures, IACR Transactions on Cryptographic Hardware and Embedded Systems 2018 (2018), No. 3, 21-43.

Daniel Heinz and Thomas Pöppelmann, Combined fault and DPA protection for lattice-based cryptography, IACR Cryptol. ePrint Arch. (2021), 101, https://eprint.iacr.org/2021/101.

Saad Islam, Koksal Mus, Richa Singh, Patrick Schaumont, and Berk Sunar, Signature correction attack on dilithium signature scheme, arXiv (2022), https://arxiv.org/abs/2203.00637.

National Institute of Standards and Technology, Post-quantum cryptography standardization, https://csrc.nist.gov/Projects/Post-Quantum-Cryptography/Post-Quantum-Cryptography-Standardization.

Ausmita Sarker, Mehran Mozaffari Kermani, and Reza Azarderakhsh, Error detection architectures for ring polynomial multiplication and modular reduction of ring-lwe in $\Box/p\Box[x]xn+1$ benchmarked on asic, IEEE Transactions on Reliability 70 (2021), No. 1, 362-370.

Ausmita Sarker, Mehran Mozaffari-Kermani, and Reza Azarderakhsh, Hardware constructions for error detection of number-theoretic transform utilized in securecryptographic architectures, IEEE Transactions on Very Large Scale Integration (VLSI) Systems 27 (2019), No. 3, 738-741.

F. S. Vainstein, Low redundancy polynomial checks for numerical computation, Appl. Algebra Eng., Commun. Comput. 7 (1996), No. 6, 439-447.

Keita Xagawa, Akira Ito, Rel Ueno, Junko Takahashi, and Naofumi Homma, Faultinjection attacks against nist's post-quantum cryptography round 3 KEM candidates, Advances in Cryptology—ASIACRYPT 2021—27th International Conference on the Theory and Application of Cryptology and Information Security, Singapore, Dec. 6-10, 2021, Proceedings, Part II (Mehdi Tibouchi and Huaxiong Wang, eds.), Lecture Notes in Computer Science, vol. 13091, Springer, 2021, pp. 33-61.

\* cited by examiner

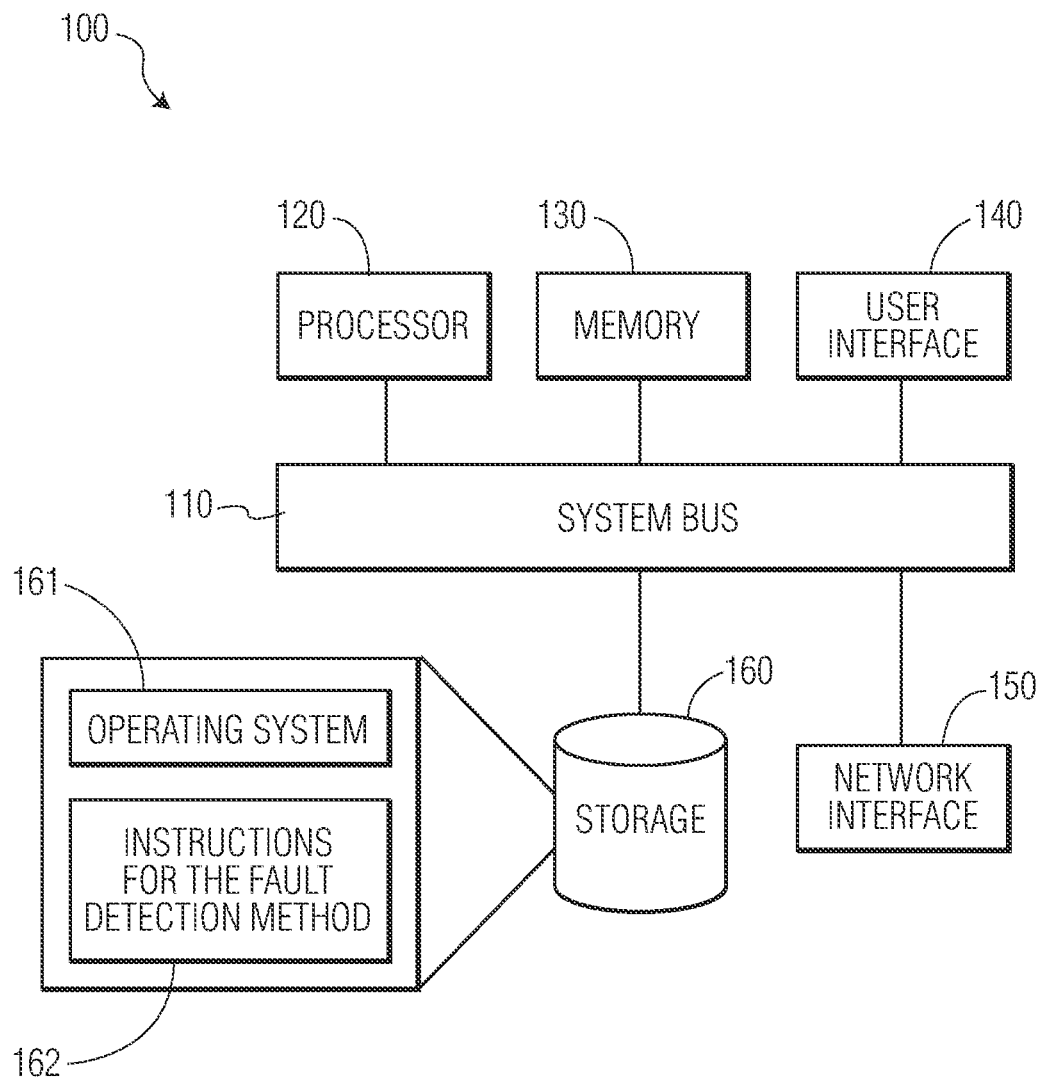

FAULT DETECTION OF DIFFERENTIAL FAULT ATTACK IN LATTICE BASED CRYPTOGRAPHY

FIELD OF THE DISCLOSURE

Various exemplary embodiments disclosed herein relate to fault detection of differential fault attack in lattice based cryptography.

BACKGROUND

Embedded implementations of post-quantum lattice-based cryptography schemes can be targeted by fault injection attacks (FIA). FIA inject errors into a device during the execution of a cryptographic scheme, then use algebraic approaches or statistical distinguishers to derive the secret key.

SUMMARY

A summary of various exemplary embodiments is presented below.

Various embodiments relate to a data processing system comprising instructions embodied in a non-transitory computer readable medium, the instructions for a fault detection in a digital signature algorithm in a processor, the instructions, comprising: computing vector z based on a secret nonce vector y, a first secret key vector $s_1$, and a challenge polynomial c, wherein vectors z, y, and $s_1$ include l polynomials having n coefficients, wherein polynomial c has n coefficients, and wherein l and n are integers; computing a difference value between all of the coefficients of the polynomials in the vector z; computing a number of how many of the computed difference values are outside a specified value range; computing a digital signature for an input message; and rejecting the digital signature when the computed number is greater than a threshold value.

Various embodiments are described, further comprising accepting the digital signature when the computed number is not greater than the threshold value.

Various embodiments are described, wherein the specified value range is $[-2\tau\eta, 2\tau\eta]$ where $\eta \in \{2,4\}$ and $\tau \in \{39, 49, 60\}$.

Various embodiments are described, wherein the digital signature algorithm is Dilithium.

Further various embodiments relate to a data processing system comprising instructions embodied in a non-transitory computer readable medium, the instructions for a fault detection in a digital signature algorithm in a processor, the instructions, including: computing vector z based on a secret nonce vector y, a first secret key vector $s_1$, and a challenge polynomial c, wherein vectors z, y, and $s_1$ include l polynomials having n coefficients, wherein polynomial c has n coefficients, and wherein l and n are integers; right shifting all of the coefficients of the polynomials in the vector z by a bits wherein a is an integer; computing a number of shifted coefficients of the polynomials in the vector z that have a same value; computing a digital signature for an input message; and rejecting the digital signature when the computed number is greater than a threshold value.

Various embodiments are described, further comprising accepting the digital signature when the computed number is not greater than the threshold value.

Various embodiments are described, wherein the value of a satisfies $\tau\eta < 2^a$ wherein $\eta \in \{2,4\}$ and $\tau \in \{39, 49, 60\}$.

Various embodiments are described, wherein the digital signature algorithm is Dilithium.

Further various embodiments relate to a fault detection method for a digital signature algorithm, including: computing vector z based on a secret nonce vector y, a first secret key vector $s_1$, and a challenge polynomial c, wherein vectors z, y, and $s_1$ include l polynomials having n coefficients, wherein polynomial c has n coefficients, and wherein l and n are integers; computing a difference value between all of the coefficients of the polynomials in the vector z; computing a number of how many of the computed difference values are outside a specified value range; computing a digital signature for an input message; and rejecting the digital signature when the computed number is greater than a threshold value.

Various embodiments are described, further comprising accepting the digital signature when the computed number is not greater than the threshold value.

Various embodiments are described, wherein the specified value range is $[-2\tau\eta, 2\tau\eta]$ where $\eta \in \{2,4\}$ and $\tau \in \{39, 49, 60\}$.

Various embodiments are described, wherein the digital signature algorithm is Dilithium.

Further various embodiments relate to a fault detection method for a digital signature algorithm, including: computing vector z based on a secret nonce vector y, a first secret key vector $s_1$, and a challenge polynomial c, wherein vectors z, y, and $s_1$ include l polynomials having n coefficients, wherein polynomial c has n coefficients, and wherein l and n are integers; right shifting all of the coefficients of the polynomials in the vector z by a bits wherein a is an integer; computing a number of shifted coefficients of the polynomials in the vector z that have a same value; computing a digital signature for an input message; and rejecting the digital signature when the computed number is greater than a threshold value.

Various embodiments are described, further comprising accepting the digital signature when the computed number is not greater than the threshold value.

Various embodiments are described, wherein the value of a satisfies in $\tau\eta < 2^a$ wherein $\eta \in \{2,4\}$ and $\tau \in \{39, 49, 60\}$.

Various embodiments are described, wherein the digital signature algorithm is Dilithium.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended FIG. 1 illustrates an exemplary hardware diagram for implementing a fault detection method.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of lattice-based cryptographic systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with lattice-based cryptographic technologies, aspects of the present disclosure can be applied in other lattice-based cryptographic schemes.

Embedded implementations of post-quantum lattice-based cryptography schemes can be targeted by fault injection attacks (FIA). FIA inject errors into a device during the execution of a cryptographic scheme, then use algebraic approaches or statistical distinguishers to derive the secret key. Two new efficient and flexible methods to detect whether a fault was injected during the execution of a Dilithium signature generation will be presented. The embodiments described herein are based on the keen observation that a fault can be detected by analyzing the differences between specific intermediate variables. Both methods are parametrizable to achieve a trade-off between performance and FIA resistance.

Recent significant advances in quantum computing have accelerated the research into post-quantum cryptography schemes: cryptographic algorithms which run on classical computers but are still secure even when faced with an adversary with access to a quantum computer. This demand is driven by interest from standardization bodies, such as the call for proposals for new public-key cryptography standards by the National Institute of Standards and Technology (NIST). On Jul. 5, 2022, NIST has selected two primary algorithms to standardize: CRYSTALS-Kyber for key establishment and CRYSTALS-Dilithium for digital signatures. In addition, the signature schemes FALCON and SPHINCS+ will also be standardized. CRYSTALS-Dilithium (which is referred to as Dilithium in the rest of this document) is the replacement for elliptic curve cryptography digital signatures (e.g., ECDSA), notably for embedded use cases.

The signing operation of a digital signature scheme generates a signature for a given message using a secret key. If this secret key was to be leaked, it would invalidate the security properties provided by the scheme. In the case of Dilithium, there is a step in the signing procedure, where a vector z is calculated according to $z=y+cs_1$, with the secret Dilithium signing key $s_1$, a polynomial c, and a secret nonce y. The parameters of Dilithium are chosen such that the value space of y is larger than that of $cs_1$ by several orders of magnitude, therefore hiding the value of $s_1$. However, if an adversary were to inject a fault in the generation of y, it could potentially lose its hiding property and the secret $s_1$ would be leaked.

To thwart this specific fault attack, a method is proposed to detect whether a fault occurred during the sampling of y. Depending on the strictness, this method may significantly increase the difficulty of the described fault attack or even make it impossible. Because higher security requirements decrease the efficiency of this method, it is designed in such a way that it is possible to balance these two aspects, according to the situation it is applied to.

The fault attack will now be described in more detail. The vector y includes l polynomials with 256 coefficients each. The coefficients are elements of $\mathbb{Z}_q$ (q=8380417) and are sampled uniformly and randomly from the range $(-\gamma, \gamma]$. Depending on the security level of Dilithium l and $\gamma$ may have the following values: $l \in \{4,5,7\}$ and $\gamma \in \{2^{17}, 2^{19}\}$. The polynomials of y will be denoted as y[i] and the coefficients as y[i,j], with $i \in \{0, \ldots, l-1\}$ and $j \in \{0, \ldots, 255\}$. The same notation will be used for other vectors and polynomials. If a certain fault is injected during the creation of y, the fault may lead to a situation where some or possibly all coefficients of corresponding polynomials in y are equal, i.e., y[i,j]=y[i',j] for $i \neq i'$ and some or all j. If one were to compute z with these faulted values, and then look at the differences of coefficients in z, the y-coefficients would cancel out:

$$z[i, j] - z[i', j] = (y[i, j] + (cs_1)[i, j]) - (y[i', j] + (cs_1)[i', j]) =$$
$$y[i, j] - y[i', j] + (cs_1)[i, j] - (cs_1)[i', j] = c(s_1[i] - s_1[i'])[j].$$

$$z[i, j] - z[i', j] = (y[i, j] + (cs_1)[i, j]) - (y[i', j] + (cs_1)[i', j]) =$$
$$y[i, j] - y[i', j] + (cs_1)[i, j] - (cs_1)[i', j] = c(s_1[i] - s_1[i'])[j].$$

$$z[i, j] - z[i', j] = (y[i, j] + (cs_1)[i, j]) - (y[i', j] + (cs_1)[i', j]) =$$
$$y[i, j] - y[i', j] + (cs_1)[i, j] - (cs_1)[i', j] = c(s_1[i] - s_1[i'])[j].$$

Because z is output as part of the signature (and therefore public), an adversary could now calculate the coefficients of $s_1$ more easily. Fortunately there are a number of simple requirements to test whether the y terms are present in this difference of z-coefficients.

To simplify the notation, $\Delta z$, $\Delta y$, $\Delta s_1$, $c\Delta s_1$ will be used to denote differences of the form $z[i,j]-z[i',j]$, $y[i,j]-y[i',j]$, $s_1[i,j]-s_1[i',j]$, $c(s_1[i]-s_1[i'])[j]$ respectively. The right shift of a (binary) number p by a bits will be denoted by p>>a.

Two embodiments of a fault detection method to determine from the z, where there is a high probability that the y were faulted will be described. The first method includes looking at every possible $\Delta z$ and counting how many of them are small (i.e., inside the range $[-2\tau\eta,2\tau\eta]$) and how many are large (i.e., outside this range). The second method looks at the values $z[i,j]>>a$ and counting how many have the same value (and thus are less than $2^a$ apart).

The strictness parameter N will correspond to the maximum number of small $\Delta z$ or duplicate $z[i,j]>>a$ that is permitted for a given signature. The strictness parameter N is a threshold value. If there are more than N of them, it is assumed that a fault was injected, the signature is discarded, and a new signature is computed. Note that N=0 results in the highest strictness, while higher values of N means reduced strictness.

For the first fault detection method, first the sizes of the variables are observed. The secret vector $s_1$ is sampled similarly to y but from the much smaller range $[-\eta,\eta]$ with $\eta \in \{2,4\}$. The challenge polynomial c has 256 coefficients, $\tau$ of which are $\pm 1$ ($\tau \in \{39,49,60\}$), and the rest of the coefficients are zero. So the range of possible values for a single coefficient in $cs_1$ is $[-\tau\eta,\tau\eta]$, and for $c\Delta s_1$ it is $[-2\tau\eta,2\tau\eta]$. On the one hand, if a $\Delta z$ is outside this range, it may be stated for sure that the $\Delta y$-term is present and no fault was injected (at least for the coefficients in question). On the other hand, because the range of $\Delta y$ is much larger than that of $c\Delta s_1$, the probability of an unfaulted $\Delta z$ lying inside of $[-2\tau\eta,2\tau\eta]$ by chance is quite small. That is the key observation that will be used as a criterion for the first fault detection method referred to as method 1.

Algorithm 1 that implements fault detection method 1 is illustrated below using pseudo code. The input to method 1 is the vector z and the strictness N. The values l, $\tau$, $\eta$ are parameters of Dilithium and therefore not explicitly mentioned as inputs. In Line 1 a counter is initialized that will count the number of small $\Delta z$. The for-loops in Lines 2 and 3 iterate over all possible combinations of polynomials in z, and the loop in Line 4 iterates over the coefficients. Lines 5 and 6 check whether a $\Delta z$ is small, and in that case the counter is incremented. Then it is determined in Line 7 if the maximum number of permitted small $\Delta z$ is surpassed. If so, the output is 1 at Line 8 because a fault is suspected. Otherwise, the output is 0 at Line 9 if no fault was detected.

| Algorithm 1 - Fault Detection Method 1 (z,N) |
| --- |
| 1:     counter = 0 |
| 2:     for i = 0,...,l − 2 do |
| 3:         for i' = i + 1,...,l − 1 do |
| 4:             for j = 0,...,255 do |
| 5:                 if z[i, j] − z[i', j] ∈ [−2τη, 2τη] then |
| 6:                     counter += 1 |
| 7:             if counter > N then |
| 8:                 return 1 |
| 9:     return 0 |

In the following the probabilities involved are analyzed, and in particular how the false positive rate depends on the strictness N is analyzed. For this the probability distributions of $\Delta y$ and $c\Delta s_1$ are needed. Without going into detail, the probability mass functions of the former are:

$$P(\Delta y = x) = \begin{cases} \frac{2\gamma - |x|}{4\gamma^2}, & x \in (-2\gamma, 2\gamma), \\ 0, & \text{else}, \end{cases} \quad (1)$$

while the latter may be approximated by a normal distribution $$\mathcal{N}\left(0, \sqrt{\frac{2}{3}\tau\eta(\eta+1)}\right).$$

For an unfaulted $\Delta z$ the probability of lying inside the range $[-2\tau\eta,2\tau\eta]$ may now be calculated in the following way:

$$P(\Delta z \in [-2\tau\eta, 2\tau\eta]) = \sum_{x=-\infty}^{\infty} P(\Delta y = x) \cdot P(c\Delta s_1 \in [-2\tau\eta - x, 2\tau\eta - x]). \quad (2)$$

This probability will be called p. This sum is in fact not infinite, because $P(\Delta y=x)$ is only non-zero for a finite number of x (see Equation 1).

For a given z with l polynomials, $$\frac{1}{2}l(l-1)$$

differences of polynomials may be derived. Because each polynomial has 256 coefficients, then $$256 \cdot \frac{1}{2}l(l-1) = 128l(l-1) =: n_z$$

differences of coefficients $\Delta z$ are obtained. The false positive rate is now the probability that more than N of those are small. Note that the different $\Delta z$ are not independent random variables. Regardless, for the ease of computation independence is assumed to approximate the false positive rate using a binomial distribution $\mathcal{B}(\eta_z, p)$:

$$FPR(N) = P(\#\Delta z > N) = 1 - P(\#\Delta z \leq N) = 1 - \sum_{k=0}^{N} \binom{n_z}{k} p^k (1-p)^{n_z - k}.$$

In an actual implementation of Dilithium it is important to know how many unfaulted signatures will have to be created until one is accepted by this fault detections method. The probability that m−1 signatures are rejected and then the m-th one is accepted is $(1-FPR)^{m-1} \cdot FPR$. The expected number of signatures until one is accepted is then:

$$E_{sig}(N) = \sum_{m=1}^{\infty} m \cdot (1 - FPR(N))^{m-1} \cdot FPR(N) = \frac{1}{1 - FPR(N)}.$$

It is important to note that Dilithium utilizes rejection sampling to create valid signatures i.e., signatures that do not leak information about any secret values, and the valid signatures are then output. So the above number is not the number of overall signatures created, but rather the number of valid signatures that already passed all rejection requirements of Dilithium itself and are then passed on to Algorithm 1.

In Table 1 all relevant values for the different parameter sets of Dilithium are summarized, and the FPR and $E_{sig}$ for exemplary values of N are provided. For the strictest fault detection (N=0) the FPR as well as the number of generated signatures $E_{sig}$ are quite high for all three NIST security levels. However, if N is increased only slightly, both the FPR and $E_{sig}$ drop relatively fast.

TABLE 1

| NIST security level | 2 | 3 | 5 |
|---|---|---|---|
| $\gamma$ | $2^{17}$ | $2^{19}$ | $2^{19}$ |
| $\tau$ | 39 | 49 | 60 |
| $\eta$ | 2 | 4 | 2 |
| l | 4 | 5 | 7 |
| $n_z$ | 1536 | 2560 | 5376 |
| $P(\Delta z \in [-2\tau\eta, 2\tau\eta])$ | 0.001190 | 0.000748 | 0.000458 |
| FPR(0) | 0.839 | 0.853 | 0.915 |
| FPR(5) | 0.011 | 0.014 | 0.040 |
| FPR(15) | $1.26 \times 10^{-10}$ | $2.59 \times 10^{-10}$ | $8.54 \times 10^{-9}$ |
| $E_{sig}(0)$ | 6.23 | 6.79 | 11.74 |
| $E_{sig}(5)$ | 1.01 | 1.01 | 1.04 |
| $E_{sig}(15)$ | ~1 | ~1 | ~1 |

Now a slightly different second method to determine how many of the y coefficients are equal or close to equal is presented. Instead of looking at the differences $\Delta z$ and counting how many of them are small, the values $\tilde{z}[i,j]=z[i,j] \gg a$ will be observed, where a is a parameter influencing the precision of the method, and it will be determined how many of them are equal. The main advantage over method 1 is that the performance is improved; whereas method 1 processes each pair of z[i,j], making it run quadratically in l, this method only processes each z[i,j] once. For performance-critical applications this could make the difference in choosing method 2 instead of method 1. The small downside is that the parameter a is less flexible than the $2\tau\eta$ bound of method 1. For most use cases this will not pose a problem, but it should be noted that this is why both methods have their merit. Additionally, it should be mentioned that in Dilithium l is a rather small number, with values of 4, 5 or 7 (depending on the security level). So the actual runtime of both methods depends more on the implementation rather than the theoretical asymptotic complexity. However, any future use case where l has larger values could potentially benefit from the linear complexity.

Recall, the vectors y are sampled uniformly and randomly from the range $(-\gamma,\gamma]$, where $\gamma \in \{2^{17}, 2^{19}\}$ and secret vector $s_1$ is sampled from the much smaller range $[-\eta,\eta]$ with $\eta \in \{2,4\}$. The challenge polynomial c has 256 coefficients, $\tau$ of which are $\pm 1$ ($\tau \in \{39,49,60\}$), and the rest are zero. So the range of possible values for a single coefficient in $cs_1$ is $[-\tau\eta,\tau\eta]$. Then also recall:

$$z[i, j] = y[i, j] + (cs_1)[i, j].\ z[i', j] = y[i', j] + (cs_1)[i', j].$$

$$z[i, j] = y[i, j] + (cs_1)[i, j].\ z[i', j] = y[i', j] + (cs_1)[i', j].$$

If $\tau\eta < 2^a$, then $$z[i, j] \gg a = (y[i, j] + (cs_1)[i, j]) \gg a. \approx y[i, j] \gg a.$$

$$z[i, j] \gg a = (y[i, j] + (cs_1)[i, j]) \gg a. \approx y[i, j] \gg a.$$

Because the same holds for z[i',j], if y[i',j] is faulted to y[i,j], then $$z[i', j] \gg a = (y[i, j] + (cs_1)[i', j]) \gg a \approx y[i, j] \gg a.$$

$$z[i', j] \gg a = (y[i, j] + (cs_1)[i', j]) \gg a \approx y[i, j] \gg a.$$

This is the property that is exploited in Algorithm 2. Algorithm 2 that implements fault detection method 2 is illustrated below using pseudo code. Algorithm 2 first computes $z[i,j] \gg a$ for all i, j in Lines 1 through 3. Lines 4 to 11 then check for the number of duplicates. This can be done by introducing a list of values that records whether a value of $\tilde{z}$ has already been seen before. This list of values is initialized to zero at Line 6. Further a counter is initiated to zero at line 4. Then Algorithm 2 loops over all of the values of $\tilde{z}[i,j]$ in lines 5 and 7. If a value is observed for the first time, the corresponding entry of values is changed to 1 in Lines 8 and 9. Otherwise, the counter is incremented by one at Line 11. Lines 5 to 11 may be done in linear time. Line 12 determines if there are more than N duplicates (for a strictness parameter N). If so, a fault is detected, and the value 1 is returned at Line 13. Otherwise a fault is not detected, and the value 0 is returned at Line 14.

| Algorithm 2 - Fault Detection Method 2 (z,N,a) | | |
|---|---|---|
| 1: | for i = 0,...,l − 1 do | |
| 2: |   for j = 0,...,255 do | |
| 3: |     $\tilde{z}[i, j] = z[i, j] \gg a$ | ▷ Cut off the a least significant bits. |
| 4: | counter = 0 | |
| 5: | for j = 0,...,255 do | |
| 6: |   values = zeros("some length") | ▷ Length should be nr of possible values of $\tilde{z}$. |
| 7: |   for i = 0,...,l − 1 do | |
| 8: |     if [$\tilde{z}$[i, j]] = 0 then | |
| 9: |       values[$\tilde{z}$[i, j]] = 1 | |
| 10: |     else | |
| 11: |       counter += 1 | |
| 12: | if counter > N then | |
| 13: |   return 1 | |
| 14: | return 0 | |

As for the first method, the false positive rate will be derived. First, what the parameter a should be for a given set of parameters needs to be considered. The following needs to be true $2\tau\eta < 2^a$, because the maximum difference of two faulted z-coefficients is $2\tau\eta$. Hence a is chosen such that $2^a$ is the smallest power of two that is larger than $2\tau\eta$. For Dilithium security levels 2 and 5, a=8 and for level 3 a=9.

Next, the situations that can lead to a false positive result will be identified. Performing a right shift by a bits is equivalent to rounding down to the next multiple of $2^a$. Now let z[i,j], z[i',j] be an unfaulted pair of coefficients. If $$z[i, j], z[i', j] \in [k \cdot 2^a, (k+1) \cdot 2^a),$$

for some integer k, then both coefficients get rounded to k and therefore produce a positive result.

For better readability define $z_1=z[i,j]$ and $z_2=z[i',j]$. Additionally a tilde • will be used to denote a value that has been shifted to the right by a bits. The false positive rate for a single pair of coefficients can now be calculated in the following way:

$$P(\tilde{z}_1 = \tilde{z}_2) = \sum_{x=-\infty}^{\infty} P(z_1 = x) \cdot P(z_2 \in [\tilde{x} \cdot 2^a, (\tilde{x}+1) \cdot 2^a - 1]), \quad (3)$$

with $P(z_1=x)$ and $P(z_2 \in [\tilde{x} \cdot 2^a, (\tilde{x}+1) \cdot 2^a - 1])$ derived from the distributions of y and $cs_1$. With these results the FPR can be calculated for different strictness parameters N and from those the expected number of signatures that have to be created. The formulas are the same as for method 1, and the results are presented in Table 2.

TABLE 2

| NIST security level | 2 | 3 | 5 |
|---|---|---|---|
| a | 8 | 9 | 8 |
| $P(\tilde{z}_1 = \tilde{z}_2)$ | 0.000485 | 0.000243 | 0.000121 |
| FPR(0) | 0.525 | 0.463 | 0.478 |
| FPR(5) | $1.25 \times 10^{-4}$ | $4.71 \times 10^{-5}$ | $6.03 \times 10^{-6}$ |
| FPR(15) | $2.22 \times 10^{-16}$ | $3.33 \times 10^{-16}$ | $6.66 \times 10^{-16}$ |
| $E_{sig}(0)$ | 2.11 | 1.86 | 1.92 |
| $E_{sig}(5)$ | ~1 | ~1 | ~1 |
| $E_{sig}(15)$ | ~1 | ~1 | ~1 |
| FNR (single coefficient) | 0.517 | 0.518 | 0.521 |

Not only does Algorithm 2 have a lower runtime by itself, but it also requires less re-runs of Dilithium's signing procedure due to the lower FPR. On the other side, however, the false negative rate should be considered as well. As mentioned before, if method 1 is used with N=0, the FNR is zero. For method 2 this does not hold. When there is a faulted pair $z_1=y+(cs_1)_1$, $z_2=y+(cs_1)_2$ with:

$$k \cdot 2^a \leq z_1 < (k+1) \cdot 2^a \leq z_2,$$

then $\tilde{z}_1=k$ and $\tilde{z}_2=k+1$. So they are rounded to different multiples of $2^a$ and pass the test undetected, regardless of the strictness N. The probability of this happening can be calculated as follows:

$$P(\tilde{z}_1 \neq \tilde{z}_2) = \sum_{x=-\infty}^{\infty} \sum_{x_1=-\infty}^{\infty} P(y = x_1) \cdot \quad (4)$$

$$P((cs_1)_1 = x - x_1) \cdot P((cs_1)_2 \notin [\tilde{x}, \tilde{x} + 2^a - x_1 - 1]).$$

In Table 2 the FNR for a single pair of coefficients is presented.

The embodiments described herein have various aspects. In a first aspect, the differences between particular intermediates are checked to detect faults aimed at breaking both deterministic and randomized signature generation. In addition the fault detection methods also protect against a differential fault attack on randomized Dilithium signing. In another aspect, the two fault detection methods may be parametrized by a strictness parameter to achieve a compromise between fault attack resistance/detectability and performance. In another aspect, the second fault detection method improves over the first fault detection method in terms of performance (from a quadratic complexity to a linear one) at the cost of an increased false negative rate.

FIG. 1 illustrates an exemplary hardware diagram 100 for implementing a fault detection method. As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 160 may store instructions 162 for carrying out the fault detection methods described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

The system bus 110 allows communication between the processor 120, memory 130, user interface 140, storage 160, and network interface 150.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A data processing system comprising instructions embodied in a non-transitory computer readable medium, the instructions for a fault detection in a digital signature algorithm in a processor, the instructions, comprising:
computing vector z based on a secret nonce vector y, a first secret key vector s_(1), and a challenge polynomial c, wherein each of the vector z, the secret nonce vector y, and the first secret key vector s_1 includes a number of polynomials l having a number coefficients n, wherein the challenge polynomial c has the number of coefficients n, and wherein the number of polynomials l and the number of coefficients n are integers;
computing a difference value between all of the n coefficients of the l polynomials in the vector z;
computing a number of how many of the computed difference values are outside a specified value range;
computing a digital signature for an input message; and
rejecting the digital signature when the computed number is greater than a threshold value.

2. The data processing system of claim 1, further comprising accepting the digital signature when the computed number is not greater than the threshold value.

3. The data processing system of claim 1, wherein the specified value range is $[-2\tau\eta, 2\tau\eta]$ where $\eta \in \{2,4\}$ and $\tau \in \{39, 49, 60\}$.

4. The data processing system of claim 1, wherein the digital signature algorithm is Dilithium.

5. A data processing system comprising instructions embodied in a non-transitory computer readable medium, the instructions for a fault detection in a digital signature algorithm in a processor, the instructions, comprising:
computing vector z based on a secret nonce vector y, a first secret key vector s_1, and a challenge polynomial c, wherein each of the vector z, the secret nonce vector y, and the first secret key vector s_1 includes a number of polynomials l having a number of coefficients n, wherein the challenge polynomial c has the number of coefficients n, and wherein the number of polynomials l and the number of coefficients n are integers;

right shifting all of the n coefficients of the l polynomials in the vector z by a number of bits a wherein the number of bits a is an integer;

computing a number of the right shifted coefficients of the polynomials in the vector z that have a same value;

computing a digital signature for an input message; and rejecting the digital signature when the computed number is greater than a threshold value.

6. The data processing system of claim 5, further comprising accepting the digital signature when the computed number is not greater than the threshold value.

7. The data processing system of claim 5, wherein the instructions cause the processor to perform a method comprising computing a number of how many of the computed difference values are outside a specified value range, the specified value range is $[-2\tau\eta, 2\tau\eta]$ where $\eta \in \{2,4\}$ and $\tau \in \{39,49,60\}$.

8. The data processing system of claim 5, wherein the digital signature algorithm is Dilithium.

9. A fault detection method for a digital signature algorithm, comprising:

computing vector z based on a secret nonce vector y, a first secret key vector s_1, and a challenge polynomial c, wherein each of the vector z, the secret nonce vector y, and the first secret key vector s_1 include a number of polynomials l having a number of coefficients n, wherein the challenge polynomial c has the number of coefficients n, and wherein the number of polynomials l and the number of coefficients n are integers;

computing a difference value between all of the n coefficients of the l polynomials in the vector z;

computing a number of how many of the computed difference values are outside a specified value range;

computing a digital signature for an input message; and rejecting the digital signature when the computed number is greater than a threshold value.

10. The method of claim 9, further comprising accepting the digital signature when the computed number is not greater than the threshold value.

11. The method of claim 9, wherein the specified value range is $[-2\tau\eta, 2\tau\eta]$ where $\eta \in \{2,4\}$ and $\tau \in \{39,49,60\}$.

12. The method of claim 9, wherein the digital signature algorithm is Dilithium.

13. A fault detection method for a digital signature algorithm, comprising:

computing vector z based on a secret nonce vector y, a first secret key vector s_1, and a challenge polynomial c, wherein each of the vector z, the secret nonce vector y, and the first secret key vector s_1 includes a number of polynomials l having a number of coefficients n, wherein the challenge polynomial c has the number of coefficients n, and wherein the number of polynomials l and the number of coefficients n are integers;

right shifting all of the n coefficients of the l polynomials in the vector z by a number of bits a wherein the number of bits a is an integer;

computing a number of right shifted coefficients of the polynomials in the vector z that have a same value;

computing a digital signature for an input message; and rejecting the digital signature when the computed number is greater than a threshold value.

14. The method of claim 13, further comprising accepting the digital signature when the computed number is not greater than the threshold value.

15. The method of claim 13, further comprising computing a number of how many of the computed difference values are outside a specified value range, wherein the specified value range is $[-2\tau\eta, 2\tau\eta]$ where $\eta \in \{2,4\}$ and $\tau \in \{39,49,60\}$.

16. The method of claim 13, wherein the digital signature algorithm is Dilithium.

* * * * *